United States Patent [19]

Fortuna

[11] Patent Number: 4,793,088

[45] Date of Patent: Dec. 27, 1988

[54] MULTIPLE REMOTE CONTROLLED DOWN RIGGER AND PLANING BOARD SYSTEM

[76] Inventor: Joseph J. Fortuna, 1506 Bonnie Dr., Bethlehem, Pa. 18018

[21] Appl. No.: 50,015

[22] Filed: May 15, 1987

[51] Int. Cl.$^4$ ............................................. A01K 89/00
[52] U.S. Cl. ..................................... 43/27.4; 43/26.1; 43/4
[58] Field of Search ................ 43/26.1, 27.4, 4, 43.12

[56] References Cited

U.S. PATENT DOCUMENTS

| | | | |
|---|---|---|---|
| 3,785,079 | 1/1974 | Rohn | 43/27.4 |
| 3,916,555 | 11/1975 | Booth | 43/27.4 |
| 3,922,808 | 12/1975 | Rieth | 43/27.4 |
| 4,191,340 | 3/1980 | Kubanek | 43/4 |
| 4,253,165 | 2/1981 | Christiansen | 43/26.1 |
| 4,339,811 | 7/1982 | Bednarz | 43/27.4 |
| 4,376,350 | 3/1983 | Bednarz | 43/27.4 |
| 4,660,317 | 4/1987 | Evans | 43/26.1 |

Primary Examiner—Kurt Rowan
Attorney, Agent, or Firm—Steele, Gould & Fried

[57] ABSTRACT

A multiple remote controlled down rigger and planing board system includes a central control unit that produces control signals for a plurality of remote controlled units disposed near reversible motors controlling the respective down rigger and planing board systems. The central controller includes a memory and input device for accepting input commands from the user at the central location and a position signal generator for generating position signals and control signals causing the down rigger and planing board fishing system to oscillate either in depth or in distance from the boat. The central unit also includes a display showing line depth and distance. The remote controlled units include means to override the control signals from the central control, each remote unit includes a local means for displaying line depth.

4 Claims, 4 Drawing Sheets

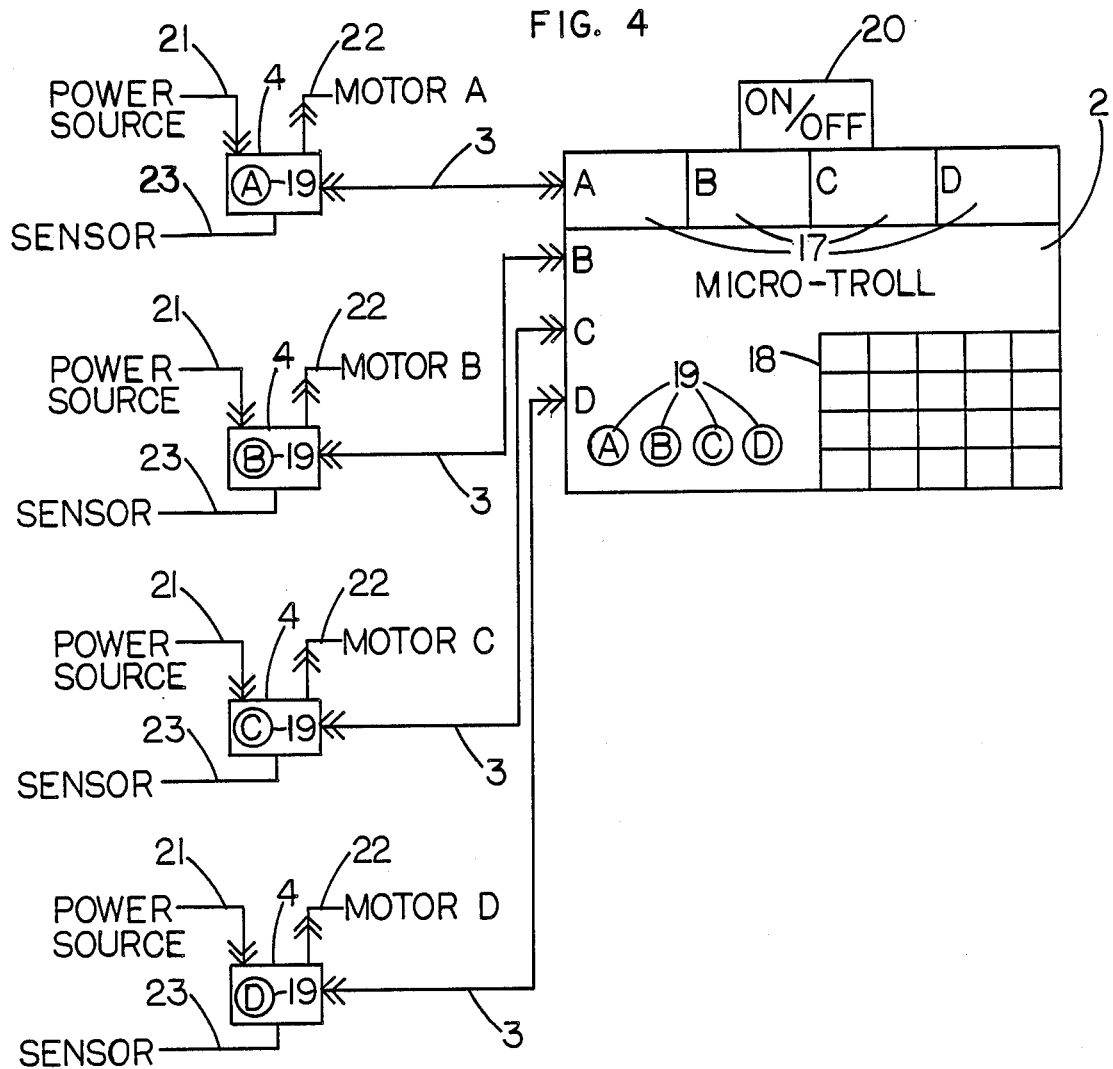
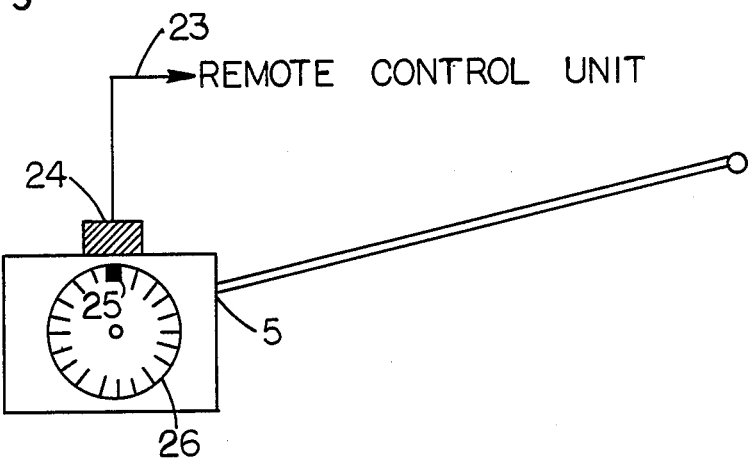

MULTIPLE REMOTE CONTROLLED DOWN RIGGER AND PLANING BOARD SYSTEM

BACKGROUND OF THE INVENTION

When trolling for fish, it has been common practice to use down rigger systems in deep water where a fishing line is releasably attached to a strong line with a heavy weight at the end. The weighted, strong line keeps the fishing line, and lure, in a near vertical position, at a desired depth, below the boat while trolling.

Similarly, when trolling for fish, it has been common practice to use a planing board system where a fishing line is releasably attached to a strong line with a planing board at the end. The planing board and strong line keep the fishing line, and lure, in a near horizontal position at a desired distance from the side of the boat while trolling.

With either the down rigger or the planing board system, when a fish strikes the baited fishing line, the fishing line pulls free from the strong vertical or horizontal positioning line, and the fisherman can then play the fish separate and apart from either the down rigger or the planing board system.

Pursuant to U.S. Pat. No. 3,910,524 to Ireland, it is known that a down rigger system can be easily operated via use of a reversible motor. Also, pursuant to U.S. Pat. No. 4,376,350 to Bednarz et al., it is known that an electronic control system can be installed on the reversible motor of a down rigger system so that an operator either can manually operate the system, which measures and displays line depths, or can program a pre-determined depth and height so that the individual down rigger unit will automatically lower and raise to the pre-determined depth and height upon the signal of a raise/lower switch.

While the above-referenced prior art systems are certainly advantageous, they require time-consuming and inconvenient individual attention for the operation of each respective down rigger system when more than one such system are concurrently used on the same fishing boat. Further, the above-referenced prior art systems require either the captain to leave the helm of the boat, or require a two man operation, via the captain instructing a mate, when the desired depth of one, or more, such system is desired to be modified because of changing bottom elevations or because of differing fish depths indicated via electronic fish finding devices. Also, when a fish is hooked, the above-referenced prior art systems require someone to make individual separate trips to each such down rigger system in use on the boat to activate the respective raise switches so as to avoid entanglement occasioned by the varying movements of the hooked fish being played.

Lastly, of great concern to a captain with a fishing party on board trolling far from land, if the art system described in the aforesaid U.S. Pat. No. 4,376,350 to Bednarz et al., should malfunction, the aforesaid art system described in U.S. Pat. No. 3,910,524 to Ireland, to which it is attached, becomes extremely difficult to utilize.

SUMMARY OF THE INVENTION

It is an object of this invention to significantly improve the above-referenced prior art systems by providing a multiple remote controlled down rigger and planing board system, capable of automatically and simultaneously controlling multiple, reversible motorized down rigger and planing board systems from a single central control box, remotely situated at any desired location on the boat, likely situate at the helm, adjacent to electronic fish-finding and depth-recording equipment, enabling the captain, alone, to simultaneously control the boat, observe bottom conditions and fish depths, and automatically control each and every down rigger and planing board system in use. Further, via one central control box, a single operator can easily and readily adjust any or all such planing board and down rigger systems in use when varying bottom conditions are encountered, when fish at varying depths are observed, or when a fish is hooked requiring the prompt retraction of all systems.

It is another object of this invention to equip such remotely and automatically controlled down rigger and planing board systems with the ability to respectively oscillate, while trolling, between varying depths or between varying distances from the boat. Such oscillation results in covering a significantly increased area and range of water when trolling and searching for fish. Further, when operating in an oscillating mode, the determination of the location of a school of fish is greatly enhanced since the captain can instantly determine the depth or distance from the boat of the fish by looking at the corresponding digital display of line depth or distance on the central control box.

Lastly, the subject invention is designed so as to allow the independent and separate manual operation of any down rigger or planing board reversible motor in the unlikely event of malfunction of the subject remote controlled systems. Other objects and features of this subject invention are set forth in the Detailed Description Of The Drawings.

BRIEF DESCRIPTION OF THE DRAWINGS

FIG. 4 is a front view of the subject multiple remote control system.

FIG. 5 is a side view of the magnetic sensing device situate on the motorized down rigger or planing board gearing.

DETAILED DESCRIPTION OF THE DRAWINGS

Figure 1:
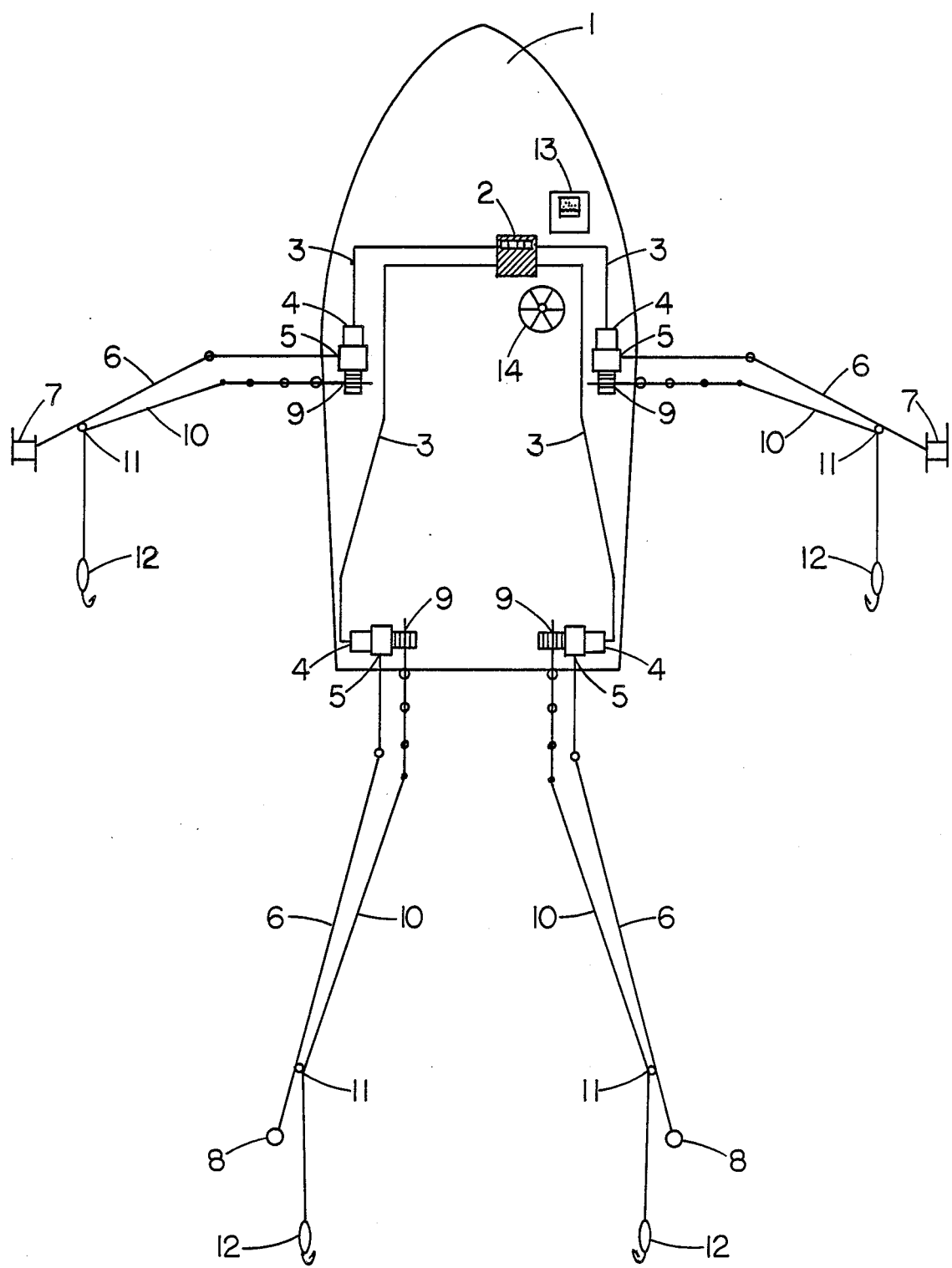
FIG. 1 is a top view of a fishing boat equipped with the subject multiple remote controlled down rigger and planing board system.

FIG. 1 shows the top view of a fishing boat 1 equipped with a central control box 2, with wires 3 connecting the central control box 2 to individual remote control units 4. The remote control units 4 are attached to respective down rigger/planing board rods with electric motor operated reels 5, from which the down rigger/planing board line 6 extends to respective planning boards 7 or to respective lead balls 8.

Fishing rods and reels 9 are respectively connected, via fishing line 10 and fishing line release clips 11, to each respective down rigger/planing board line 6.

From the extreme end of each fishing line 10, a bait and hook 12 is attached.

The central control box 2 is located adjacent to electronic fish-finding equipment 13 at the helm 14 of the boat 1.

Figure 2:
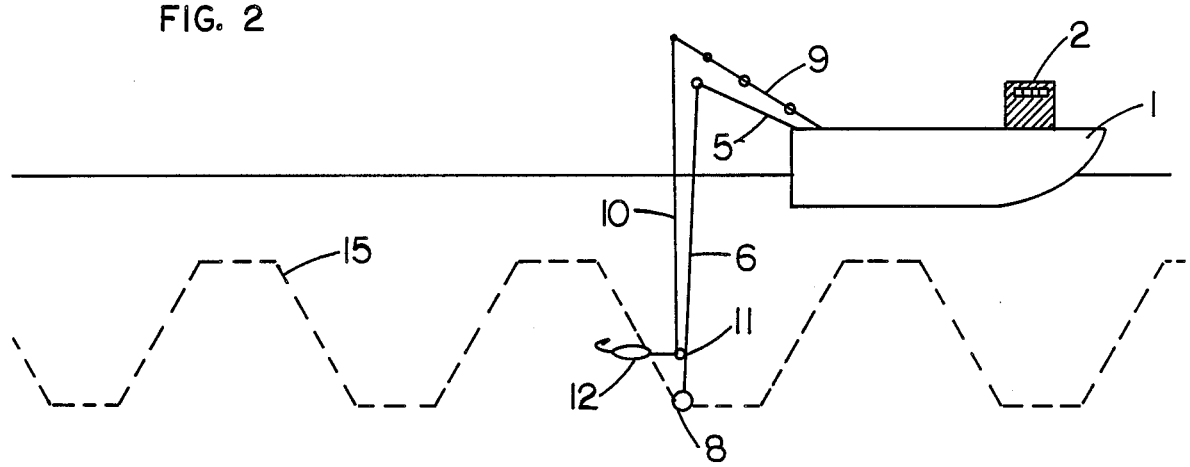
FIG. 2 is a side view of a fishing boat utilizing the subject multiple remote controlled down rigger system operating in an oscillating mode.

FIG. 2 shows the side view of a fishing boat 1 operating with its central control box 2 programmed so that a stern down rigger/planing board rod and electronic motor operated reel 5 is operating in an oscillating down rigger mode 15 so that the bait and hook 12 at the end of the fishing rod and reel's 9 fishing line 10, which is attached via a fishing line release clip 11 to the down rigger/planing board line 6 with a lead ball 8 at the bottom, continuously and automatically moves the bait and hook 12 up and down to pre-determined heights and depths programmed into the central control box 2.

Figure 3:
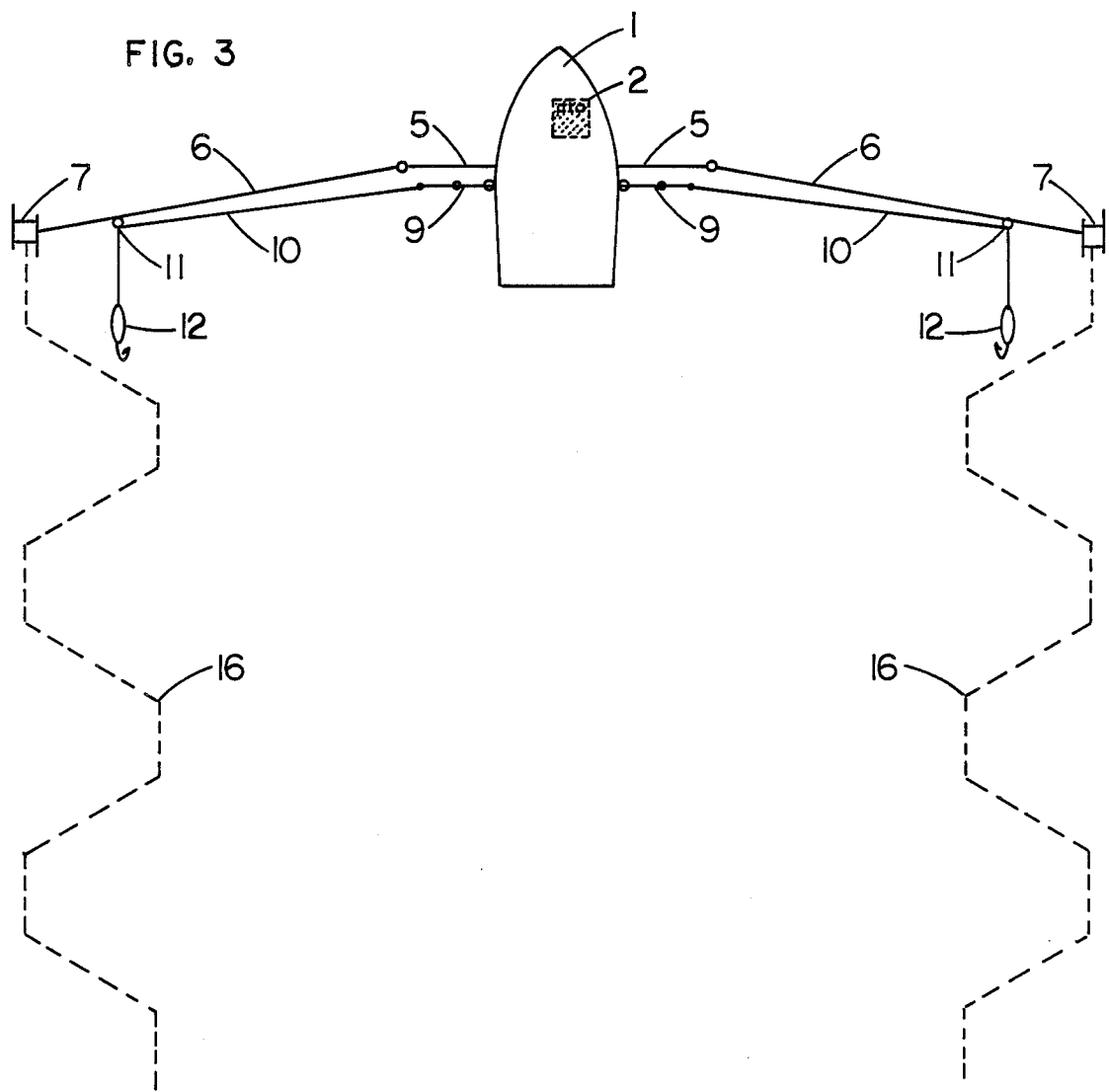
FIG. 3 is a bottom view of a fishing boat utilizing the subject multiple remote controlled planing board system operating in an oscillating mode.

FIG. 3 shows the bottom view of a fishing boat 1 operating with its central control box 2 programmed so that its two side down rigger/planing board rods and electric motor operated reels 5 are operating in an oscillating out rigger mode 16 so that the bait and hook 12 at the end of the fishing rod and reel's 9 fishing line 10, which is attached via a fishing line release clip 11 to the down rigger/planing board line 6 with a planing board 7 at the end, continuously and automatically moves the bait and hook 12 in and out to pre-determined distances from the fishing boat 1, which distances are programmed via the central control box 2.

FIG. 4 shows the central control box 2 in detail. Across the top portion of the central control box 2, there are four digital displays 17, lettered A, B, C, and D, respectively. Each digital display 17 visually shows the depth, in one foot intervals, of each respective down rigger and/or the side distance of each respective planing board. The digital displays 17 are of the LCD type.

The lower right side of the central control box 2 contains a twenty position keyboard 18 where all desired automatic operations originate via operator commands via fingertip control on the keyboard 18.

The lower left side of the central control box 2 contains four manual control switches 19, which can respectively and independently control each of the four down rigger and/or planing board systems, overriding any pre-set automatic programs entered into the central control box 2. Each of the four manual control switches 19 on the central control box 2 is respectively lettered A, B, C, and D so as to correspond to the respective digital display 17.

The power switch 20 for the central control box 2 is centrally located on the very top of the unit. The power switch 20 is utilized for turning the unit on and off.

The central control box 2 is connected to each respective remote control unit 4 via respective connecting wires 3.

Each respective remote control unit 4 contains a manual control switch 19, which can be operated independently of the manual control switches 19 on the central control box 2.

Also, each respective remote control unlit 4 contains: an input power supply line 21 capable of supplying twelve volt power from a battery or twelve volt power supply system; an output power supply line 22 to each respective motor operating each respective down rigger and/or planing board; and a sensor connecting line 23.

FIG. 5 shows a sensor 24, which is attached to the motor/reel housing of one of the down rigger/planing board rods and electric motor operated reels 5. The sensor 24 is located so that it detects each forward and each reverse pass of a magnet, or photo optic sensor, or mechanical switch, placed on a specific gear 26 in the electric motor operated reel 5 so that one foot increments will be registered and transmitted via this interrupter pulse means via a sensor connecting line 23 for visual display to the operator in one foot increments of up to nine hundred ninety-nine feet. A magnetic switch need not be used.

Figure 6:
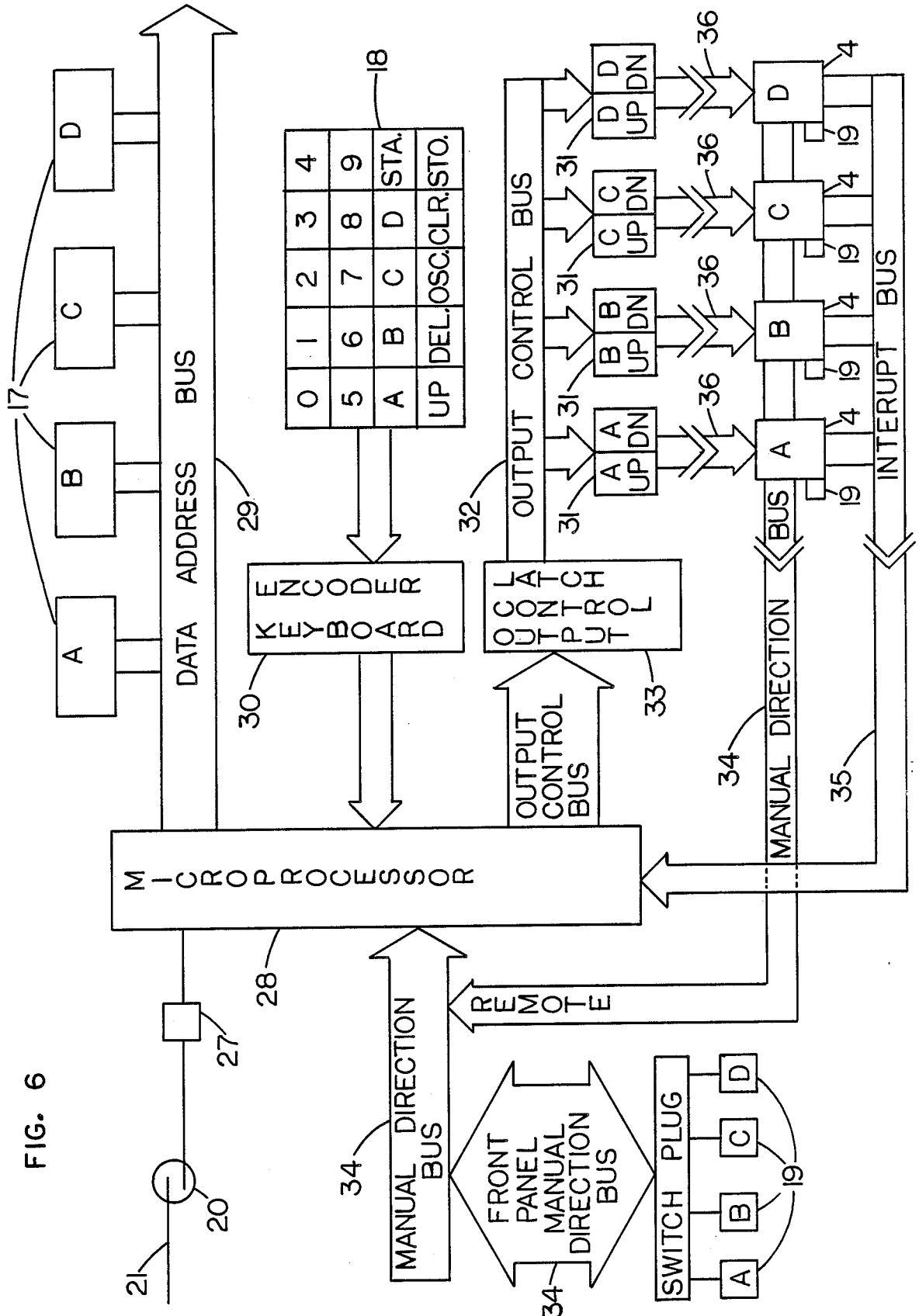
FIG. 6 is a block diagram for the control and operation of the subject invention.

FIG. 6 shows the basic configuration of the control unit. Electric power, at twelve volts, enters the unit, via the input power supply line 21, when the power switch 20 is turned on. The power is then changed to five volts, via a special voltage conditioner 27, for operation of the electronics inside the control unit.

The power, at five volts, next enters the unit's microprocessor 28, which is a 68701, NMOS type, with a 2k eprom and a 128×8 byte ram memory on board, with all necessary timing and multiplexing signals needed for operation of the control unit, and with all software stored within the eprom and ram memory.

All four respective digital displays 17 visually show decoded digital information via the data address bus 29. The said decoded digital information shown on the digital displays 17 corresponds to linear feet of line released or retrieved via each respective remote control unit 4.

All data entries made via the twenty position keyboard 18, which is of the x-y matrix type, are decoded by the keyboard encoder 30.

The opto isolators 31 tell the respective remote control units to retrieve or release line to predetermined depths or distances. The opto isolators 31 are controlled by the microprocessor 28 via the output control bus 32 through the output control latch 33, and are connected to respective remote control units 4 via interface cables 36.

The remote control units 4 respectively contain the necessary switching configuration to run the down rigger/planing board reel electric motors, to which they are attached in either forward or reverse direction. Manual control switches 19 are also mounted on each respective remote control unit 4 so as to allow independent respective manual control separate and apart from similar corresponding apparatus located on the central control unit housing the microprocessor 28. In the event of total system malfunction, readily available mechanical type counters, which are usually standard equipment on the down rigger/planing board reel motor housing, one still be utilized for visual indication of depths and distances, absent any interference with, or from, the subject system.

Manual control of the respective remote control units 4 can be accomplished via activation of any or all of the manual control switches 19. Signals from the manual control switches 19 travel to the microprocessor 28 via manual direction bus 34.

The interrupt bus 35 transmits magnetically, or otherwise, instituted signals regarding line depths or distances from the respective remote control units 4 to the microprocessor 28.

I claim:

1. A multiple remote controlled down rigger and planing board system automatically and simultaneously controlling a plurality of down rigger and planing board fishing systems, each fishing system including a reversible motor means for changing the position of a down rigger and/or planing board, from a single central control box located at any desired location on a boat based upon input commands, the remote controlled system comprising:

a central controller means, disposed in said central control box for independently generating control signals for controlling said plurality of down rigger and planing board fishing systems;

a plurality of remote controlled means disposed near and for actuating said reversible motor means and hence the respective down rigger and planing board, a respective one of said plurality of remote controlled means actuating a corresponding reversible motor means based upon a corresponding control signal from the central controller means, each said remote control means including sensing means for sensing a condition of said reversible motor indicative of a position of said down rigger and planing board and for generating a corresponding position-indicating signal;

said central controller means including:

input means for accepting said input commands and generating signal to the remote controlled units for oscillating the down rigger and planing systems between predetermined depths and/or distances, and also generating a signal for simultaneously raising and retracting all the down rigger and planing board systems;

means for displaying respective line depths for said plurality of down rigger and planing board fishing systems based upon the respective position signals from said plurality of said remote controlled means;

said remote controlled means including:

remote input means for accepting input commands at said reversible motor means and for local generation of an override control signal that supersedes said corresponding control signal; and, local means for displaying line depth for said respective down rigger and planing board systems based upon said corresponding position signal.

2. An automatic down rigger and planing board control system for controlling the depth within a body of water of the lower portions of a plurality of weighted lines extending from a fishing vessel, as well as for controlling the distance from the side of the fishing vessel of th exterior end portions if a plurality of planing board lines extending from the fishing vessel, comprising:

(a) a plurality of fishing devices each including a reel with a line and reversible power means for rotating the reel to extend and retract the associated line, (b) an electronic control means and a plurality of remote electronic controlled means, a respective remote electronic controlled means operatively connected to each of said power means by a multi-position connection means including an input device to the electronic control means for inputting a predetermined depth for the lower ends of the weighted lines, and indicating a predetermined desired distance for the exterior ends of the planing board lines, (c) interrupter pulse means at each respective reel of the plurality of fishing devices for monitoring rotation of the respective reel in either direction, (d) electronic tracking means coupled to said interruptor pulse means for tracking rotation of the respective reel for calculating the length of line extended therefrom, and means for coupling said remote controlled means and said electronic tracking means to a central unit, (e) central electronic memory means at said central unit for storing said predetermined desired depth for each of the lines, (f) comparator means at said central unit coupled to said memory means and said electronic tracking means for determining a difference between the predetermined desired depth for each line and the length of line extended from each reel, (g) electronic circuit means at said central unit coupled to said comparator means for energizing the reversible power motor of each line, via said means for coupling, in a direction to decrease the difference between the length of line and the predetermined desired depth stored in memory, (h) visual display means, at each remote controlled means, for indicating the depth and/or distance for a respective reel and input means at the central unit accepting a desired predetermined depth and a predetermined desired point at or near the surface of the water to which the lines are to be retracted when said lines are already extended, and, (i) remote means for actuating the reversible motor means of each line reel based upon said predetermined depth and/or distance and said length of line extended from the respective reel.

3. A remote controlled system as claimed in claim 1 wherein said means for generating a position signal ultimately causes said respective down rigger and planing board fishing system to change one of the depth position of said down rigger and/or said planing board and the lateral position of said planing board with respect to said boat.

4. A multiple remote controlled down rigger and planing board system, capable of automatically and simultaneously controlling a plurality of down rigger and planing board fishing systems, each fishing system including a reversible motor means for changing the position of a down rigger and/or planing board, from a single central control box located at any desired location on a boat based upon input commands, the remote controlled system comprising:

a central controller means, disposed in said central box, for independently generating control signals for controlling said plurality of down rigger and planing board fishing systems;

a plurality of remote controlled means disposed near and for actuating said reverible motor means and hence the respective down rigger and planing board, a respective remote control means actuating a corresponding reversible motor means based upon the corresponding control signal, each said remote control means including sensing means for sensing a condition of said reversible motor indicative of a position of said down rigger and planing board and for generating a corresponding position-indicating signal;

said central controller means including:

input means for accepting said input commands and generating said corresponding control signal for said respective down rigger and planing board systems;

means for displaying respective line depth for said down rigger and planing board fishing system based upon the respective position signals from said plurality of said remote control means;

said remote control means including;

remote input means for accepting said input commands at said reversible motor means and for local generation of an override control signal that supersedes said corresponding control signal; and, local means for displaying line depth for said respective down rigger and planing board based upon said corresponding position signal.

* * * * *